United States Patent

Burgin et al.

[11] 3,982,786
[45] Sept. 28, 1976

[54] CHAIR OR ARMCHAIR

[76] Inventors: Gérard Burgin, 6, Rue de la Thur, Kingersheim, France; Adolf Klingler, Hubertusstrasse 45, 757 Baden-Baden, Germany

[22] Filed: Sept. 23, 1974

[21] Appl. No.: 508,157

[52] U.S. Cl............................ 297/284; 5/349; 297/339; 297/DIG. 3
[51] Int. Cl.²........................................ A47C 3/00
[58] Field of Search............. 297/284, 339, DIG. 3; 5/349

[56] References Cited
UNITED STATES PATENTS

| | | | |
|---|---|---|---|
| 1,282,980 | 10/1918 | Takach | 5/349 |
| 2,136,510 | 11/1938 | Jensen | 297/284 X |
| 2,938,570 | 5/1960 | Flajole | 297/339 |
| 3,192,541 | 7/1965 | Moore | 297/284 X |
| 3,363,941 | 1/1968 | Wierwille | 297/284 |
| 3,540,776 | 11/1970 | Wilson | 297/284 X |
| 3,608,961 | 9/1971 | Von Heck | 297/284 |

*Primary Examiner*—James T. McCall
*Assistant Examiner*—William E. Lyddane
*Attorney, Agent, or Firm*—Shenier & O'Connor

[57] ABSTRACT

The invention concerns a chair or an armchair with a seat cushion and a back rest cushion, of which at least one is composed of several cushion elements forming a grid and capable of being filled with a flowable medium, at least a number of which elements are capable of being connected exclusively with each other through pipes containing at least one valve.

10 Claims, 10 Drawing Figures

CHAIR OR ARMCHAIR

BACKGROUND OF THE INVENTION

From the British Pat. No. 486,985, a seat cushion for such a chair or armchair is already known. From each cushion element of this seat cushion a pipe leads to the cushion, which is so formed that all cushion elements are connected with each other through the pipes and the valve housing in every condition. The cushion elements can be jointly and simultaneously connected through the valve to a compressed air source.

This seat cushion has a considerable disadvantage: As is known, lengthy sitting in one and the same position leads to pronounced fatigue, as well as also to disturbances in blood circulation especially in the legs. Therefore, after some time, every seated person changes position quite spontaneously, and thereby his seated position. A prerequisite for substantially fatigue-free sitting, however, is the necessity that the body be effectively supported which, however, is the case only to a very limited extent according to the British Pat. No. 486,985, since, as a result of the fact that all cushion elements always communicate with each other, the seat cushion surface yields all over and therefore is not in a position to brace the body of the seated person, so that at all times a considerable amount of muscular exertion is required to hold a certain seated position.

This disadvantage does not arise in other known seating equipment with more or less unyielding cushions of a certain form, but these cushions obviously are capable of optimally supporting the body of a seated person only in a certain seated position, since they cannot adapt to other seated positions.

In this connection, it should be noted that the formulation that the cushion elements be exclusively connectable with one another through the pipes, naturally does not mean that they are not also connectable to a compressed air source or the like, but rather it is only to be stated that in one position of the valve or valves only a connection of the cushion elements with one another takes place and not simultaneously also a connection to the compressed air source or the like.

This is important in view of U.S. Pat. No. 2,938,570 which describes an armchair, the seat and back rest cushion of which is built up of inflatable cushion elements. For this purpose, a pipe leads from each cushion element to a valve that is connected to a compressed air source. According to the position of this valve, the connection between all cushion elements and the compressed air is interrupted, or one, several or all cushion elements are connected to the compressed air source, in which case they naturally are also connected to each other. In this known armchair, however, the cushion elements do not form a grid but form flat elements superposed in a direction perpendicular to the cushion plane, since the purpose of this known construction consists only in shifting the body position of a seated person in a direction perpendicular to the cushion plane by inflating the cushion elements do a greater or lesser degree. This known armchair is therefore not comparable with the chair or armchair according to the invention, neither from the standpoint of the problem to be solved nor in view of its structural configuration, since, as mentioned, the cushion elements do not form a grid and moreover they are always also connected to a compressed air source when they are connected with each other through the said valve.

Finally, from German publication for opposition (DT-AS) 1,296,761 seating equipment is known, the back rest cushion of which is composed of inflatable cushion elements extending laterally. Furthermore, an additional inflatable cushion element which likewise extends laterally and rises obliquely upwards and backwards is arranged at the back part of the seat cushion for straightening the spine. The remaining portion of the seat cushion is free of cushion elements. Aside from the fact that in this seating equipment also the cushion elements do not form a grid and as a result the cushion cannot optimally adapt to various sitting positions, it is also impossible in this known seating equipment to arrive by a certain valve positioning at a state in which by altering the seating position air is displaced from one cushion element to another and that this distribution of the cushion medium can be maintained.

Any flowable medium may be used as the cushion medium, i.e. air, any other gas, or a more or less viscous fluid.

It is also conceivable to apply the basic conception of the invention to other seating equipment which has only a seat cushion or a seat cushion in combination with a not especially cushioned back. In the same way, the invention may also be applied for reclining and sleeping. Preferably, office chairs and automobile seats will be constructed according to the invention.

SUMMARY OF THE INVENTION

Now the inventors have determined that especially advantageous seat positions result, if the cushion medium squeezed out of certain cushion elements upon a shifting of weight is not distributed evenly to all the remaining cushion elements, but rather can be displaced only into certain other cushion elements. In a preferred embodiment of the invention, therefore, selected cushion elements are connected with each other by valved or valve-less direct connecting pipes, so that with weight applied to one or more of these selected cushion elements the pressure is only increased in the other selected cushion elements connected to the aforementioned cushion elements in order to retain a selected seat configuration. In this embodiment, it would be possible to provide, for instance, a manually-operated valve in each direct connection pipe. However, it is advantageous if limit pressure valves are built into the direct connecting pipes, the starting pressure of which is so selected that the cushion elements sufficiently support the body in every sitting position but that the valves open as a result of the increased pressure in certain cushion elements upon a voluntary and energetically completed change in the seated position so that the cushion can adapt itself to the new seated position. After a completed change in the seated position, the limit pressure valves again close and sufficiently retain the new cushion shape. Seating equipment constructed in such a manner in accordance with the invention offers an excellent possibility for muscular activity which has been proven to prevent fatigue symptoms upon lengthy sitting: With suitable valve positioning, exertion is required to displace air or the like from part of the cushion elements by suitable body movements.

By the aforementioned step of providing direct connecting pipes only between selected cushion elements, the deformability of the cushion can be held within certain limits, since, upon a change in the seated position, the hardness of the non-selected cushion elements remains unchanged, because the quantity of the cushion medium contained therein cannot change. Such a construction offers the possibility, for instance, of using certain cushion elements as a support similar to the known seat wedge for the pelvis, since cushion medium from the cushion elements on which the buttocks mainly rest can only be displaced into those cushion elements behind the said elements for the purpose of a corresponding expansion in the same. With a suitably chosen mutual connection of selected cushion elements among each other, the automatic formation of such a seat wedge can be assured in any seated position.

Likewise, however, the connection of selected cushion elements can be carried out in such a way that when pressure is applied to the cushion, in addition to the aforementioned pelvic support, side bulges, for instance, are formed, so that the seat and/or back rest surfaces become cup-shaped. Finally, the possibility may be mentioned of arranging a lumbar vertebrae support in any seated position by a suitable selection of the cushion elements to be directly connected to each other in the back rest cushion, insofar as in the area of the second and fifth lumbar vertebrae a bend in the back rest will result by especially strong inflation of at least one cushion element which will enforce an erect body posture.

In an especially simple embodiment of the invention of seating equipment, all cushion elements of the individual cushion are connectable with each other and separable from each other through a central and, in particular, a manually operable valve. Upon a change in the seated position, therefore, only one single valve must be opened until the cushion surface has adapted to the new sitting position, whereupon the valve is again closed, in order to retain the newly obtained cushion form and thereby to obtain optimum support of the body in the new seated position.

Because of the anatomy of the body, particularly good results can be achieved with such seating equipment according to the invention in which the cushion elements of the cushion form an irregular grid. In particular, the transverse measurements at least in the cushion elements arranged in the rear area of the seat cushion should be smaller than the distance between the eminences of the ischia of the pelvis. This guarantees that the eminences of the ischia in any possible seated position will rest on different cushion elements, which with suitable connection of their interiors with corresponding other cushion elements will bring about optimal seating conditions on the seat cushion.

Particularly in motor vehicles it may be advantageous to provide at least a portion of the cushion elements with valves controllable in response to acceleration, so that upon exceeding a prescribed limit speed they will function or close. Then the cushion shape cannot change essentially on curves upon rapid acceleration and hard braking, so that the seated person maintains his previously selected position.

On the other hand, however, it may be advantageous particularly in motor vehicles to provide an excess pressure valve at least in the cushion elements of the back rest cushion so that upon suddenly excessive back pressure of the body as it may, for instance, occur in a collision accident from the rear, the back rest cushion can suitably yield and thereby moderate the whiplash effect.

In a further embodiment of the invention, finally, a portion of the cushion elements may be joined to a control device connected with a pressure source, by which upon generation of highly excessive back pressures the correspondingly weighted cushion elements are connectable with the pressure source for the additional input of a certain volume of cushion medium. Thereby a certain seating position may be maintained largely unchanged temporarily even under extreme conditions.

BRIEF DESCRIPTION OF THE DRAWINGS

The drawings show an embodiment of a desk armchair constructed according to the invention, as well as possible variations in the structural configuration of its cushions.

DESCRIPTION OF THE PREFERRED EMBODIMENTS

Figure 1:
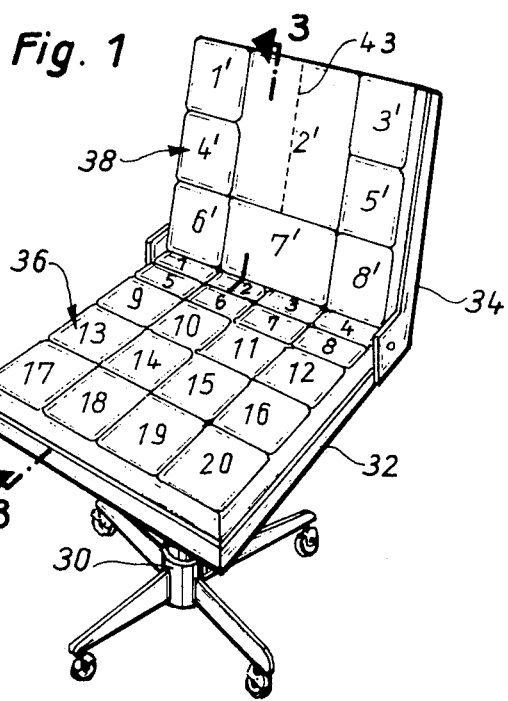
FIG. 1 is a perspective view of the armchair from above.

The seat plate 32 mounted on a height-adjusting threaded rod 30 of the illustrated desk armchair carries a back rest 34 positionable in the known manner at any desired inclination. The seat plate, as well as the back rest, are equipped with cushions designated generally by the numerals 36 and 38, characterized by the feature that their surfaces, formed by numerous support surfaces, will adapt to any form and posture of the body of a person sitting on the chair and that the thereby resulting surface form of the cushions is maintainable is its actuated condition for relieving the back muscles and for supporting the pelvis, as well as for stabilizing the buttocks. For this purpose, the said support surfaces of both cushions and formed of a plurality of individually fillable and preferably inflatable cushion elements 1' through 8' or 1 through 20 which according to the invention, are laid out in such a manner that upon an increase in pressure they primarily expand in the direction from which the load is applied. Viewed transversely of the cushions, the cushion elements lie in adjacent rows and in this case form an irregular grid. These are illustrated schematically in FIG. 2, from which it will be seen, that the support surfaces or cushion elements 1 to 20 of the seat cushion 36 have equal transverse measurements, while the two transverse rows of cushion elements 1 to 4 or 5 to 8 adjacent the back rest are considerably smaller in their longitudinal measurement than the remaining three subsequent rows and preferably are merely half as large as the support surface of the latter rows of cushion elements.

In a similar way, the grid of the back rest cushion 38 is also formed irregularly, insofar as, viewed longitudinally, the two outer rows of support surfaces 1', 4' and 6' or 3', 5' and 8' are alike in size, while the lower cushion element 7' adjacent the seat cushion 36, viewed longitudinally, has the same measurement as the cushion elements of the aforementioned lateral rows, but, for instance, twice as large a transverse measurement as the adjacent cushion elements. The cushion element 2' adjoining the cushion element 7' and lying between the said outer rows fills out the remaining area of the cushion 38; one or both of the two cushion elements 2' and 7', if necessary, being subdivided by a quilting seam 43 and preferably the cushions or their cushion elements being equipped with a cover, not shown, covering the same.

Figure 2:
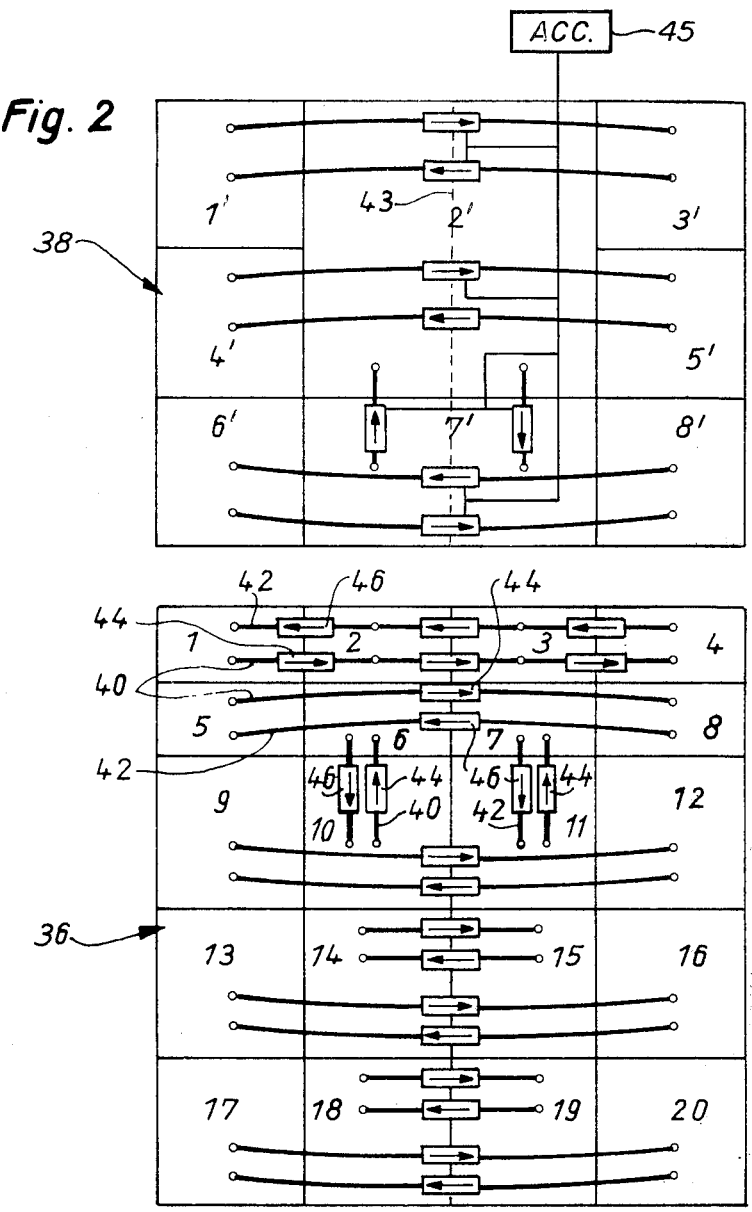
FIG. 2 shows the division of the cushion elements of the seat and back rest cushions of the armchair in a schematic illustration in the form of a grid.
Figure 5:
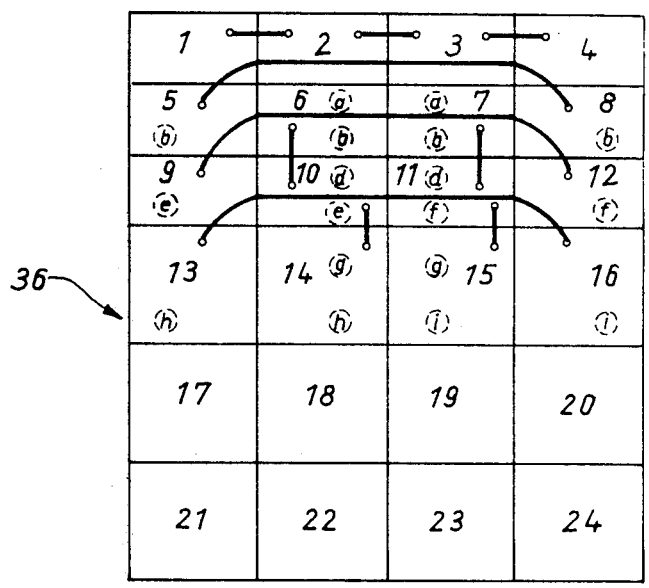
FIG. 5 shows a grid for illustration of a further possible embodiment of the seat cushion.

In order to maintain the two cushions or the support surfaces formed by their cushion elements in the shape adapted to the position of the sitter in the manner described above and in this way to stabilize the body posture assumed by the sitter, as may be seen in FIGS. 2 and 5, for instance, cushion elements belonging to the same grid rows or to different rows adjacent or spaced from each other, may communicate with each other continuously or intermittently in such a way that, through the weight of the body to be stabilized, the air or any other suitable gas will be displaced from the cushion elements bearing the greater weight into the cushion elements connected with them and after entrance into the corresponding by-pass space will be prevented from flowing back as the case may be. By a well-chosen reciprocal connection of certain cushion elements an additional effective support of the pelvis and the lumbar vertebrae can thereby be achieved and therefore a proper postural support of the buttocks and back. In the embodiment illustrated schematically in FIG. 2, the cushion elements 1 to 4 of the last cross row in seat cushion 36 are connected for this purpose to each other by means of pipes 40 or 42, a one-way valve being inserted each time between two connecting points. Obviously, valves may also be used which operate in response to pressure in both directions in the sense of a stabilization, so that merely one connecting pipe is required each time. In the embodiment shown, accordingly, the three serially connected valves permit passage of the air through the valve in the same direction, which is indicated by arrows. One-way valves 44 or 46 are built into both pipes 40, 42 which permit passage of air in directions opposite to each other from one to another cushion element. Accordingly, if the support surface formed by cushion elements 1 and 2 which are connected with each other are more heavily weighted than the remaining support surfaces of the cushion elements 3 and 4, air is displaced from the cushion elements 1 and 2 into the two other cushion elements and will be held back there, so that they are inflated and thereby increase in height in order to again adapt to the corresponding buttock part for its support under pressure.

The cushion elements which are interconnected form a cell containing a normally constant mass of fluid. For example, cushion elements 5 and 8 form a first cell. Similarly, cushion elements 9 and 12 form a second cell; cushion elements 6 and 10 form a third cell; and cushion elements 7 and 11 form a fourth cell. While the masses of fluid contained in the various elements of a cell may vary in response to changes in loading, there is normally no change in the sums of the masses of fluid contained within the individual elements of a cell.

In the same manner in the present embodiment, for example, the outside cushion elements belonging to the same cross row are connected with each other, while the cushion elements surrounded by them are connected with the neighboring cushion elements of an adjacent cross row or the same cross row. In a similar manner, the cushion elements of the back rest cushion 38 are connected with each other, it being unnecessary to describe the connecting paths in detail on the basis of the chosen illustration.

Figure 4:
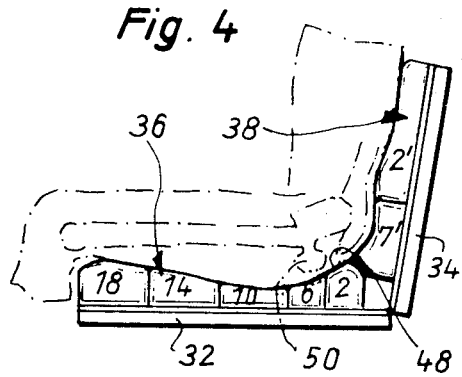

With the connection of cushion elements of both cushions 36, 38 controlled in this way, the result is that in normal seated position a pelvic support, in itself known, is located in the rear area of the seat cushion 36, and that moreover the back rest cushion in the area of the second and fifth lumbar vertebrae will lie more closely against the small of the back for supporting the spine because of the volume of air displaced by contact of the buttocks out of the center cushion element 7' of the back rest cushion 38 into the cushion element 2'. Now if the seated person changes position by, for instance, weighting the seat cushion farther forward, the volume of air present in the cushion elements 10 and 11 will partially escape into the cushion elements 6 and 7 because of the increased pressure on the basis of the reciprocal connection of the cushion elements 6 and 10, as well as 7 and 11, upon corresponding easing on the cushion elements 6 and 7, so that, as shown in FIG. 4, the cushion elements 6 and 7 of the cushion 36 are included in the formation of pelvic support 48.

Figure 6:
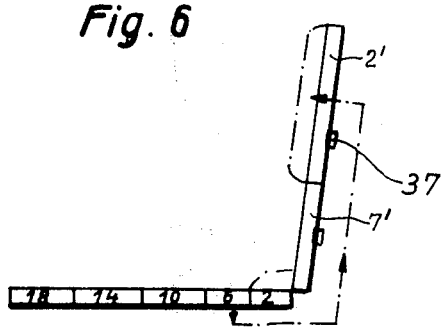
FIGS. 6 and 7 show substantially schematicized longitudinal sections through the seat and back rest cushion along line 3—3 of FIG. 1 to illustrate a possible connection of the cushion elements of the seat cushion with those of the back rest cushion.
Figure 7:
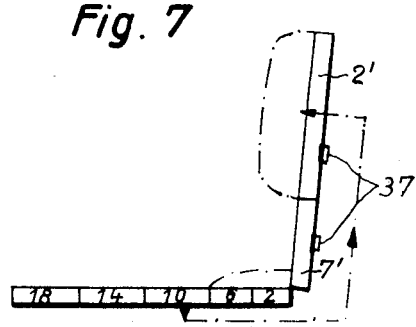

In the described manner, obviously, a reciprocal connection of the cushion elements of both cushion 36 and 38 among each other may be arranged as this is shown greatly simplified and schematicized in FIGS. 6 and 7. These illustrations make plain that by a suitable connection of corresponding cushion elements that, upon a change in the seated position, air displaced from cushion elements bearing a greater weight, may also be used, for instance, to effectively equalize the distance between the body of the sitter and the back rest cushion resulting from the changed position. In this case, the use as the cushion medium of a combination of a gas with a fluid may be advantageous, namely, in the sense that the cushion elements of the back seat cushion 38 and possibly at least those of the seat cushion 36 which are connected to cushion elements of the back rest cushion, are, for instance, filled with fluid which after easing of the load on the back rest cushion will always to a corresponding extent flow by gravity back down into the cushion elements of the seat cushion from which it was displaced.

The cushions which, on the basis of this arrangement according to the invention, adapt to a changed body position, assure an effective support for both eminences of the ischia 50 of the pelvis which is decisive for fatigue-free sitting. For this reason, preferably, the transverse measurements of the cushion elements 1 to 12 at least in the rear area of the seat cushion are smaller than the distance between the eminences of the ischia of the pelvis so that always in any seated position only one cushion element is situated below the eminences of the ischia, which cushion elements assure an effective support in any body position on the basis of their hollows which are separated from each other. In certain areas of the cushions a different division of the cushion elements may be made than that shown in FIG. 2 and especially in such a way that the middle cushion elements 2 and 3, as well as possibly 6 and 7, of the seat cushion form only one cushion element.

Automobile seats, made in accordance with the principle of the invention, may be formed in a simple manner by a suitable connection of cushion elements in such a way that the seat cushions, as well as also possibly their back rest cushions assume a cup-shape upon being weighted and in which moreover the necessary supports are present or are formed. In the tubing serving to connect the individual cushion elements such valves will preferably be used as will interrupt the reciprocal connection of the cushion elements when the pressure becomes excessive, in order to avoid thereby that exceeding a predetermined acceleration value, e.g. in traversing curves or upon great acceleration or deceleration, can bring about no undesirable change in the cushion surfaces which have been fixed in relation to a certain body posture. For example, an acceleration responsive device 45 may actuate a linkage 47 to close all of the valves 44 and 46 associated with the back cushion 38. A further substantial improvement can moreover provide that by means of a control device under certain pressure demands additional air or another medium may be introduced into correspondingly weighted cushion elements by a pressure source, so that suddenly a force counter to the load may become effective which will maintain the seated position substantially unchanged. For example, a suitable sensing means 49 responsive to a load exceeding the normal load could open a valve 51 connected to a suitable source of fluid under pressure to connect certain of the seat cushions to the source. It may be mentioned furthermore that the connection of the individual cushion elements may be varied among each other so that, for instance, different elements are reciprocally connected directly and others indirectly by insertion of suitable valves and/or a control device as aforementioned and connected to a pressure source and/or a stopcock permitting manual and optional interruption of the connection. Various combinations of valves, control and stopcock, in the connecting pipes are conceivable, namely:

a. A direct connection of cushion elements without insertion of any valves,
b. A direct connection with a stopcock,
c. A direct connection with a valve,
d. A direct connection with a valve and a stopcock,
e. All possibilities listed under (a) to (d) in combination with a control device connected to an air pressure source.

In a further improvement of such an automobile seat, at least a part of the cushion elements of at least the back rest cushion can be provided with an excess pressure valve 37 which provides an air vent from the cushion elements and therefore an effective moderation of the whiplash especially during a sudden unusually great increase in the surface pressure by the back of the driver on the back rest cushion in a collision accident from the rear.

In the grid for a set cushion shown as a further embodiment in FIG. 5 the reciprocal connecting paths of the individually connected cushion elements which correspond in their configuration to those in FIG. 2, simply illustrated by one line and the pairs of similar circled lower case letters, represent various seated positions with the location of the eminences of the ischia. The seated positions indicated by the lower case letters are briefly described as follows:

Seated Position a.
The eminences of the ischia are located above the cushion elements 6 and 7, whereby the spine is supported by cushion elements 1 to 4 in the last cross row.

Seated Position b.
The eminences of the ischia are located above the cushion elements 5 and 6, the pelvis or the spine being likewise supported by the cushion elements 1 to 4. Moreover, the direct reciprocal connection of the cushion elements 5 and 8 brings about growth or heightening of the latter, so that therefore the unburdened part of the seat cushion conforms to the buttocks and effectively stabilizes the same on the basis of the fact that the air cannot again flow back without application of increased pressure.

Seated Position c.
The eminences of the ischia are located above the cushion elements 7 and 8, resulting in support of the pelvis and the spine by the cushion elements 1 to 4 and beyond this the cushion element 5 is filled with air for stabilizing the buttocks.

Seated Position d.
The eminences of the ischia (d) are located above the cushion elements 10 and 11 which are individually directly connected to the cushion elements 6 and 7 which effect inflation of the latter for support of the pelvis and the spine, i.e., the formation of a support wedge.

Seated Position e.
The eminences of the ischia (e) are located above the cushion elements 9 and 10, so that pelvis and spine are supported by the cushion element 6. Moreover the direct connection of the two cushion elements 9 and 12 brings about an inflation and conforming of the latter to the buttocks.

Seated Position f.
The eminences of the ischia (f) are located above the cushion elements 11 and 12, so that a pelvic and spinal support is effected by the cushion element 7 which is directly connected to the cushion element 11.

Figure 3:
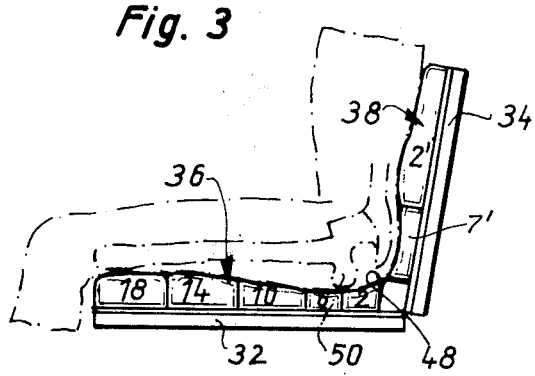
FIGS. 3 and 4 show a schematic longitudinal section through the seat and back rest cushion along the line 3—3 of FIG. 1 to illustrate various seat positions.

Seated Position g.
In this case the eminences of the ischia are located above the cushion elements 14, 15 which are individually directly connected with the cushion elements 10 and 11. As a result, additional air is introduced into the cushion elements 10 and 11 and possibly into the cushion elements 6 and 7, so that these are raised and thereby likewise form an effective pelvic support. The pelvic support increases therefore in this case, analogously to the illustrations in FIGS. 3 and 4 and it therefore expands forwardly.

Seated Position h.
In this case, the eminences of the ischia are located on the cushion elements 13 and 14, whereby on the one hand the spine is supported by the cushion element 10 and, on the other hand, by a direct connection of the cushion element 13 with the cushion element 16, the latter is inflated with air to a greater extent and thereby under pressure conforms to the displaced buttocks, the cushion element 15 being likewise raised with it.

Seated Position i.
In this position of the eminences of the ischia, the two cushion elements 15 and 16 are weighted, the cushion element 11 acting as a pelvic support by virtue of its connection with cushion element 15 and cushion element 13 lying opposite cushion element 16 is made to conform under pressure to the buttocks. Insofar as the seated person rises from one of the described seat positions, the air in the cushion elements is held back by the one-way valves 44, 46 provided in the individual connecting lines 40, 42, i.e., they retain their air or gas content brought about by the momentary weight and the cushion cannot of itself level itself when it is free of weight, but retains in the sense of invention its surface form adapted to the body. As a result, there exists for the user of such a seat the possibility of muscular activity when fatigue symptoms arise after lengthy sitting in the same position, since the user by moving his back and his buttocks, i.e. by shifting weight, can actuate the individual cushion elements to promote the circulation by the flow resistance between cushion element and cushion element effected by the individual valve devices.

Figure 8:
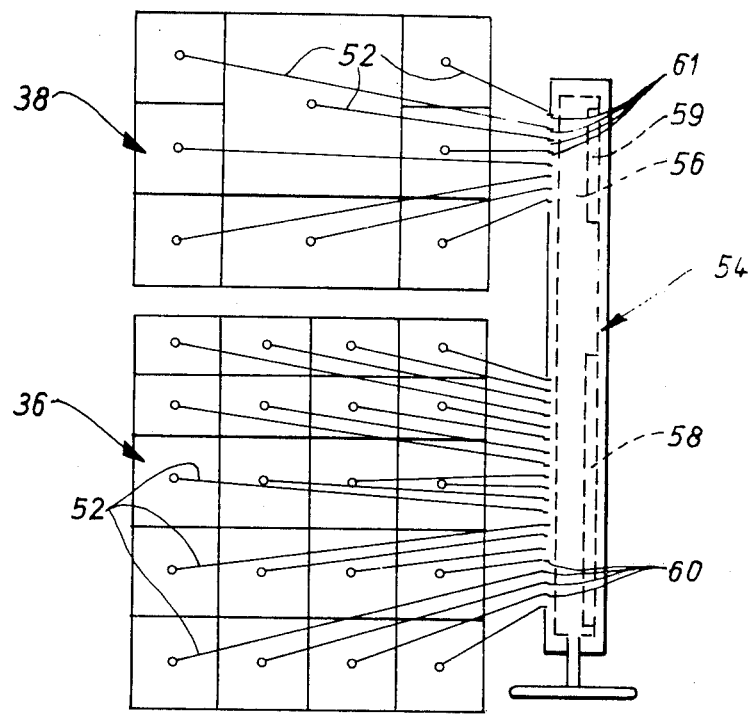
FIG. 8 shows a grid illustrating the construction of the seat and back rest cushion in connection with a valve device for maintaining the cushions of a structural variation of the cushion construction shown in FIG. 2.

FIG. 8 shows a further possibility of how the cushion elements adapt to the body form in a momentary seat position and may be maintained therein. For this purpose, the individual cushion elements of preferably both cushions 36 and 38 are connected by one connecting line 52 to a common manually operable valve device 54, which makes it possible either to connect all of the cushion elements of cushion 36 or 38 with each other or to interrupt their reciprocal connection. For stabilizing the body in a newly assumed seat position the valve member 56 is accordingly to be turned in such a way that, e.g. per cushion, a connecting channel 58 or 59 extending along a cover line of the same arrives at the outlet ports 60 or 61 of the valve device and by the resulting reciprocal connection of the cushion elements air is displaced from the more heavily loaded cushion elements to the less heavily loaded cushion elements and thereby an adaptation of the cushion surfaces to the body form is achieved. Obviously, the valve device will be so constructed that the valve jointly connecting the cushion elements of the various cushions 36, 38 offers a certain flow resistance to avoid the momentary emptying of the more heavily loaded elements and, in the sense of the invention, assures a good cushioning effect in the area of the eminences of the ischia. When the cushions have adapted to the new body position, they can be so maintained by closing the valve device. As a matter of fact, in place of the common valve device for the seat and back rest cushions, a valve device may be provided for each of them.

Figure 9:
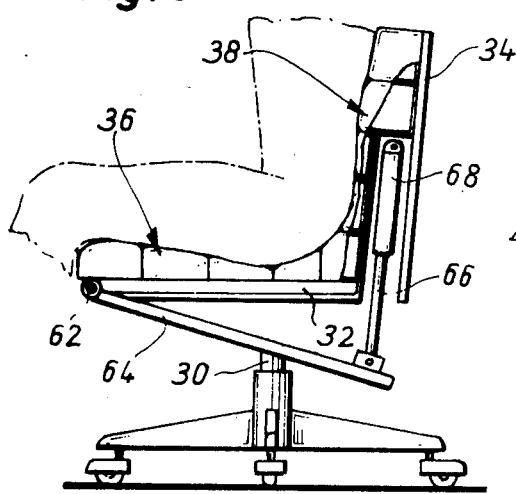
FIGS. 9 and 10 show partially broken side views of an improved armchair according to FIG. 1, the seat of which is adjustable in various inclined positions.
Figure 10:
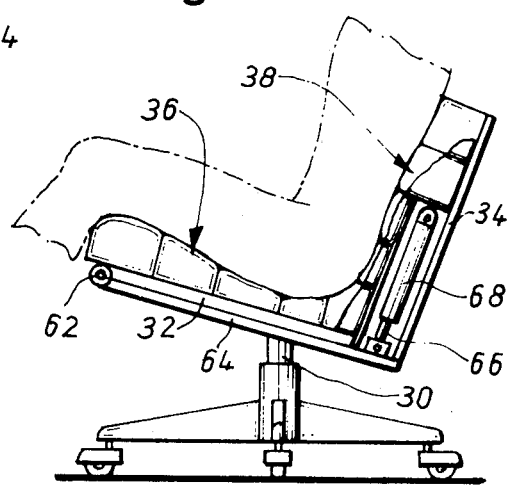

FIGS. 9 and 10, finally, show an improved construction of a desk chair or work chair in which its seat plate 32 is tiltable around a horizontal transverse pivot 62. The latter is located in the frontal area or at the front edge of the seat plate 32 and is held to a seat carrier 64 mounted on the threaded column 30 and in the direction of the front edge of the seat at an angle of, preferably, 27° to 30°. Moreover, a piston rod 66 of a cylinder 68 built into the back rest is pivotally connected to this seat carrier 64, and with the aid of which, as may be seen in both figures, a desired inclination of the seat and back rest cushions may be maintained. This construction offers the advantage that the once adjusted seat height in the area of the bend of the knee brings about no new height adjustment upon later alteration of the seat in a corresponding inclined position, whereby, particularly, in work chairs, the pressure load on the lower parts of the thighs upon tipping of the seat surface transversely backwardly is effectively avoided.

Having thus described our invention what we claim is:

1. A fluid cushion including in combination a first and a second fluid impervious cell, the cells being disposed in a generally planar array to provide a load supporting surface, the first and second cells containing normally constant masses of fluid independent of the loading on said support surface, the first cell comprising a first and a second cushion element, the second cell being disposed intermediate the first and second elements, and means responsive to the loading on said support surface for permitting reversible fluid flow between the first and second elements upon predetermined positive and negative differences in the fluid pressures therebetween.

2. A cushion as in claim 1 further including a source of fluid and means for selectively coupling said source to the first and second cells, to vary the normally constant masses of fluid contained therein.

3. A cushion as in claim 1 further including a source of fluid and means for selectively coupling said source to the first and second elements and to the second cell, to vary the masses of fluid contained in the first and second cells.

4. A fluid cushion as in claim 1 wherein the second cell comprises a third and a fourth cushion element, the cushion further including means responsive to the loading on said support surface for permitting fluid flow between the third and fourth elements upon predetermined differences in fluid pressures therebetween.

5. A fluid cushion as in claim 1 further including a third fluid impervious cell disposed in said generally planar array, the third cell containing a normally constant mass of fluid independent of the loading on said support surface.

6. A fluid cushion as in claim 5 wherein the third cell is disposed intermediate the first and second elements.

7. A fluid cushion as in claim 5 wherein the third cell comprises a third and a fourth cushion element, the cushion further including means responsive to the loading on said support surface for permitting fluid flow between the third and fourth elements upon predetermined differences in fluid pressures therebetween.

8. A fluid cushion as in claim 7 wherein the third cell comprises a fifth cushion element, the cushion further including means responsive to the loading on said support surface for permitting fluid flow between the fourth and fifth cushion elements upon predetermined differences in fluid pressures therebetween.

9. A cushion as in claim 1 wherein the load responsive means includes a pressure relief valve.

10. A cushion as in claim 1 wherein the load responsive means includes a first pressure relief valve permitting a flow of fluid from the first element to the second element and a second pressure relief valve permitting a flow of fluid from the second element to the first element.

* * * * *